July 5, 1960
G. H. REVERMAN, JR
2,943,455
REFRIGERATOR CABINET
Filed July 26, 1957
3 Sheets-Sheet 1
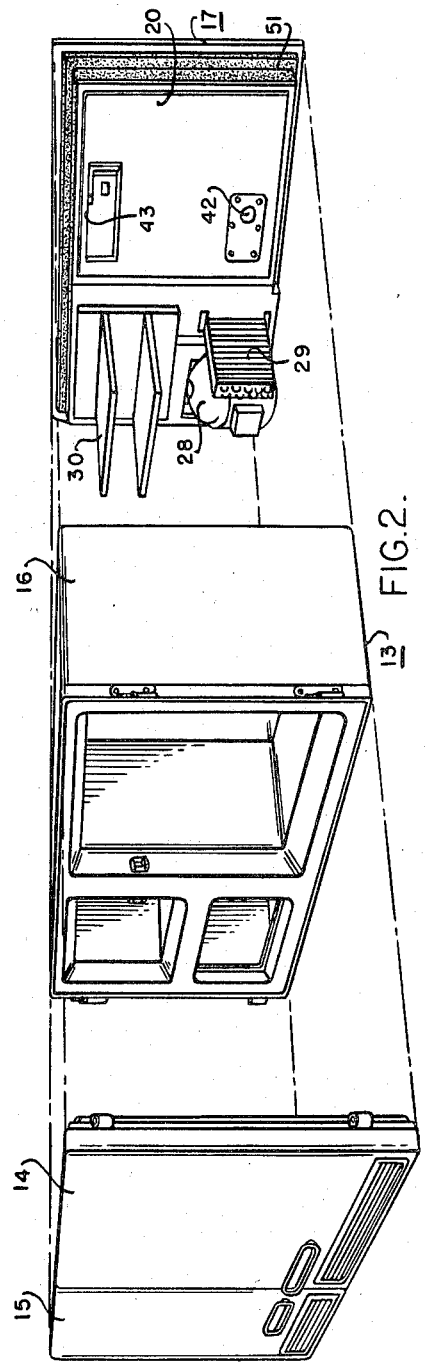
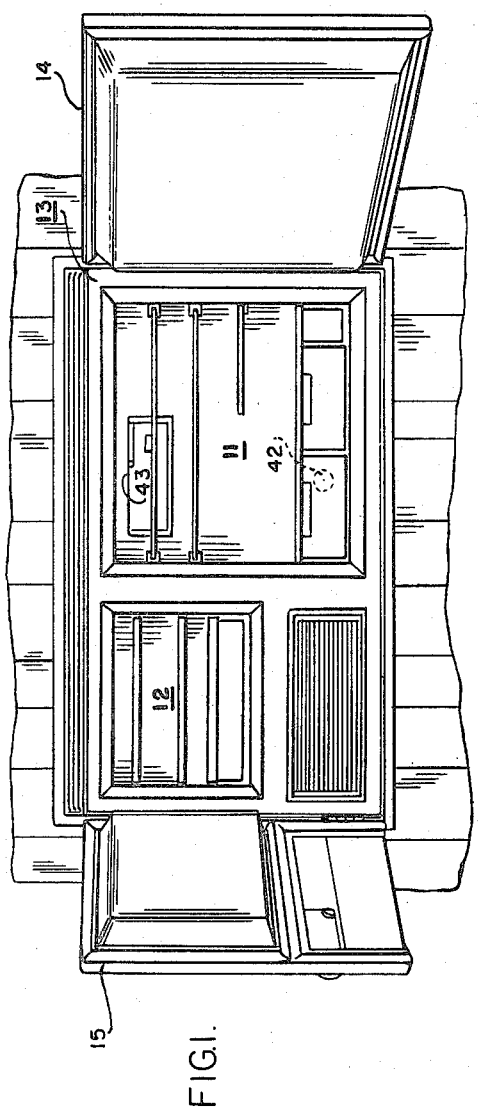
INVENTOR
GEORGE H. REVERMAN, JR.
BY *William J. Foley*
ATTORNEY July 5, 1960 G. H. REVERMAN, JR 2,943,455
REFRIGERATOR CABINET
Filed July 26, 1957 3 Sheets-Sheet 2
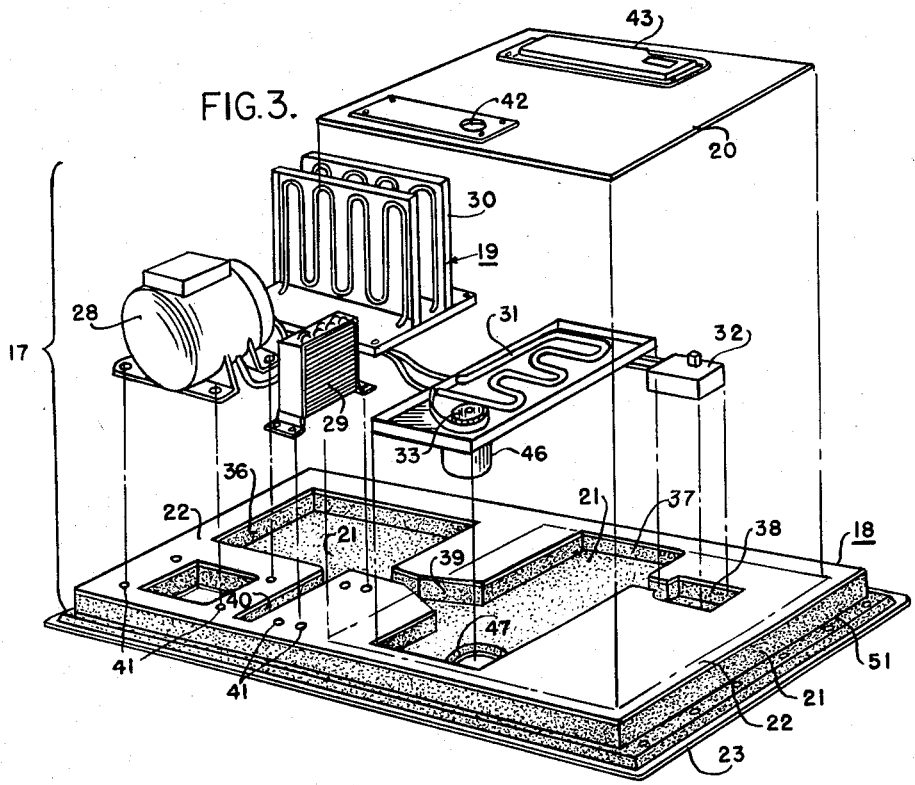
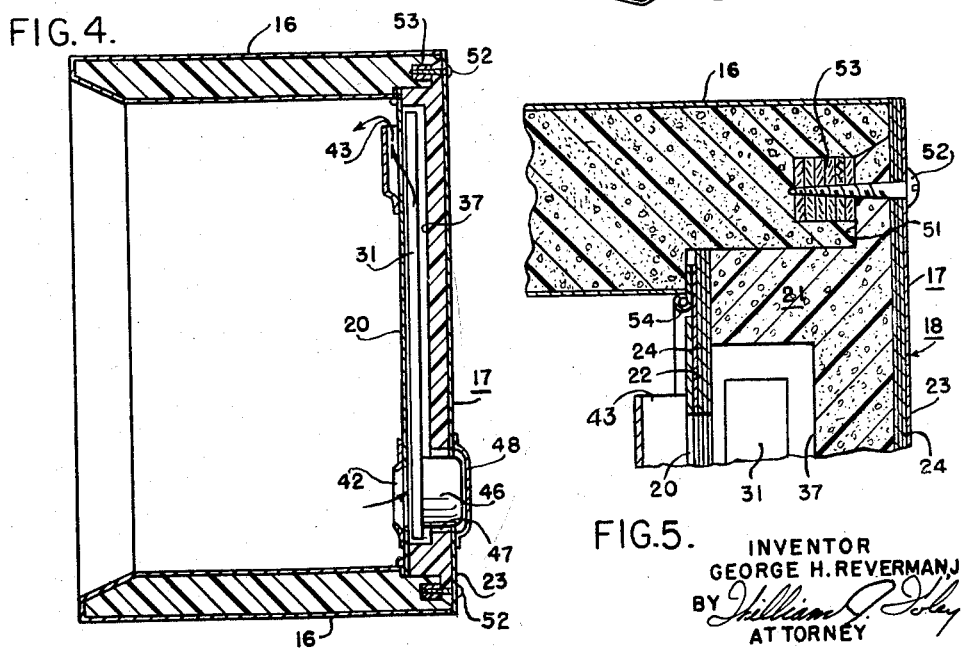
INVENTOR
GEORGE H. REVERMAN, JR
BY
ATTORNEY July 5, 1960  G. H. REVERMAN, JR  2,943,455
REFRIGERATOR CABINET Filed July 26, 1957  3 Sheets-Sheet 3

INVENTOR
GEORGE H. REVERMAN, JR.
BY *William J. Foley*
ATTORNEY

United States Patent Office 2,943,455
Patented July 5, 1960

2,943,455
REFRIGERATOR CABINET

George H. Reverman, Jr., Columbus, Ohio, assignor to Westinghouse Electric Corporation, East Pittsburgh, Pa., a corporation of Pennsylvania Filed July 26, 1957, Ser. No. 674,517

5 Claims. (Cl. 62—77)

This invention relates to refrigeration apparatus and more particularly to an improved cabinet structure for domestic refrigerators, and to an improved method of fabricating such cabinets.

Comparatively recent developments in the synthetic materials field have made available improved synthetic materials for the construction of insulated cabinets for domestic refrigerators. The advent of low-cost plastic materials having good strength and thermal insulating characteristics has rendered it economically feasible to manufacture domestic refrigerators in unusual and unique cabinet styles, and to do so even in low volume, or short production runs.

The production of a limited number of refrigerators of a given design, or the production of varied styles or cabinet configurations, is economically possible with these new materials because the manufacturer's tool investment for the fabrication of plastic cabinets is considerably less than the investment required for tools to fabricate metal cabinets by conventional manufacturing techniques. The plastic materials can be fabricated with low-cost tools, often of the ordinary wood-working variety.

While the applicability of recently developed plastic insulating materials to refrigerator cabinet structures can be readily appreciated, their use requires the development of new manufacturing techniques, and the need for unique and novel structural arrangements to assure satisfactory performance of a low-cost cabinet is not eliminated simply by the availability of the new materials. The object of this invention is the provision of a domestic refrigerator that can be easily and economically constructed of plastic materials and which will perform satisfactorily when measured by previously established standards.

This invention concerns particularly the utilization of so-called "sandwich" type, laminated insulating structures that are produced in flat board, or panel, form and generally comprise two faces or skins of dense material separated by and bonded to an insulating core of light plastic foam. Such panels have excellent strength and thermal insulating properties. Ideally, the sandwich is composed of: one skin that becomes a part of the inner shell of the refrigerator cabinet and which is preferably formed of a smooth-surfaced, easily-cleaned plastic sheet of a material such as polystyrene or cellulose acetate butyrate; an insulating core of a light plastic foam having a discrete closed cell structure for low water absorption and low water vapor permeability, such as expanded polystyrene; and a tough, impact-resistant skin to form the outer shell of the refrigerator cabinet, which skin is made from material such as a glass fiber reinforced polyester resin or, optionally, a metal sheet. The sandwich may also include layers or fillers of plywood or like material capable of strengthening the sandwich and providing areas for the insertion of screws or other fasteners that are required in the fabrication of the complete cabinet assembly.

This invention contemplates utilization of this type of sandwich panel as a structural wall for the refrigerator cabinet, which wall, in addition to performing heat insulating and cabinet strengthening functions, supports the refrigerating system employed to cool the cabinet and has reception areas for the cooling element or elements of the refrigerating system. More specifically, the invention contemplates the routing out of certain areas in the inner face of the sandwich wall member for receiving components of the refrigerating system and particularly the evaporator, or cooling unit, employed to chill the air within the cabinet. This structural arrangement utilizes, and is made possible by, the characteristics of the closed cell foam core of the sandwich which prevent the absorption and transmission of water and water vapor through the sandwich wall member even though one skin thereof is perforated. The combination of the sandwich wall member with the cooling unit assembled in a routed-out area of the wall permits the cooling unit to be excluded from view to enhance the appearance of the interior of the refrigerator, and does so in a more facile manner than was possible with prior cabinet structures which required either special provisions for the exclusion of moisture from the cooling unit, if embedded in the insulating material, or special and expensive formations in the inner wall surface of the cabinet.

This invention additionally contributes an integral assembly comprising a wall of the cabinet and the refrigerating system for the cabinet, which assembly can be fabricated and tested prior to its being combined with other portions of the refrigerator cabinet structure, to facilitate its manufacture. At the same time, this unit assembly is so constructed as to become an integral, load-carrying part of the completed cabinet.

Other features, advantages and objects of this invention will become apparent from the following detailed description thereof in which reference is made to the accompanying drawings wherein:

Fig. 1 is a front view of a domestic refrigerator constructed in accordance with this invention, and in which the doors are shown open to reveal the interior of cabinet;

Fig. 2 is an exploded perspective view of the refrigerator cabinet, illustrating the relationship of the basic components of the cabinet;

Fig. 3 is an exploded perspective view of the refrigerating unit and sandwich wall assembly that forms the back wall of the cabinet shown in Figs. 1 and 2;

Fig. 4 is a vertical sectional view through the food storage compartment of the refrigerator;

Fig. 5 is an enlarged fragmentary sectional view illustrating a junction between the back and top wall members of the cabinet;

Figure 6:
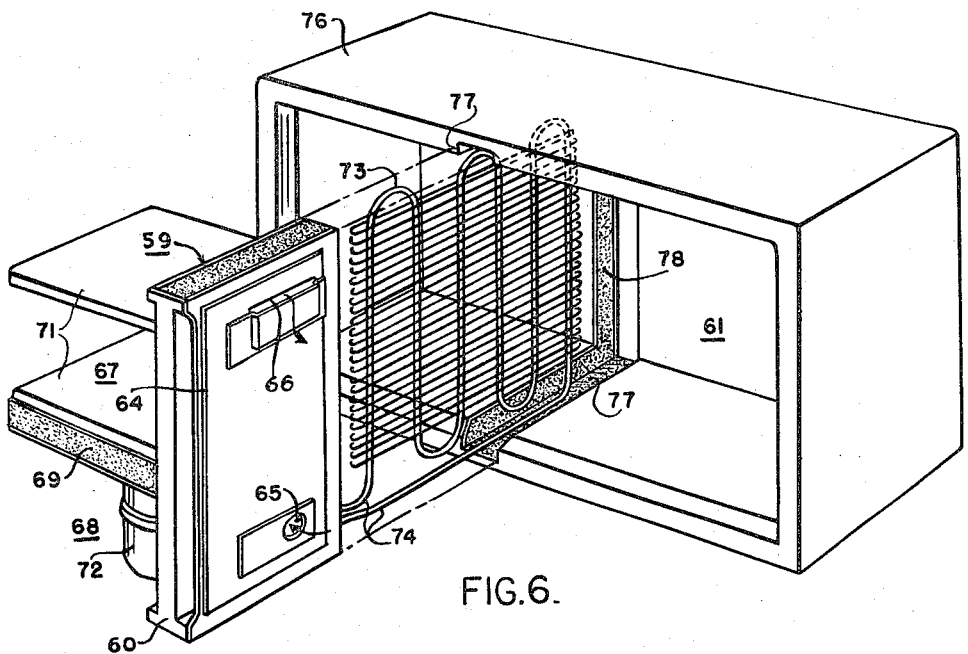
Fig. 6 is a perspective view illustrating a step in the assembly of a modified refrigerator cabinet constructed in accordance with this invention.

Referring particularly to Figs. 1 and 2, this invention is illustrated in a preferred embodiment as applied to a horizontal, wall-mounted, or built-in, refrigerator having a food storage compartment 11 and a freezing compartment 12 defined by a cabinet 13 that includes a pair of doors 14 and 15 at the front thereof for providing access to the compartments. The cabinet 13 comprises three major subassemblies: a shell 16 that is a heat insulating structure defining the side walls of the cabinet and of the compartments 11 and 12, and which is open at its front and rear; the doors 14 and 15 that are adapted to close the front of the shell 16; and a rear wall assembly 17 for closing and sealing the rear of the cabinet shell 16.

This invention is particularly concerned with the construction of the rear wall assembly 17 which is illustrated more clearly in Fig. 3. In general, the invention concerns the construction of a refrigerator wall assembly having as an integral portion thereof a laminated plastic sandwich panel, or board, 18 composed of two faces, or skins, of dense material separated by an insulating core of lightweight plastic foam. It is contemplated that the cabinet shell 16 also be constructed of this material although the particular construction of the shell 16 forms no part of this invention; the invention being applicable to a refrigerator having a shell, or other portion thereof, constructed in conventional fashion, as by means of spaced inner and outer metallic structures having insulating material loosely disposed therebetween.

Referring in detail to Fig. 3, the wall assembly 17 includes the plastic sandwich insulating panel 18 that carries a refrigerating system identified generally by the numeral 19, and a cover plate or sheet 20 for decoratively covering portions of the refrigerating system. These elements are assembled together for in such a manner that the wall assembly 17, when joined to other portions of the cabinet 13, forms an integral part of the cabinet for structural purposes, and positions and maintains the refrigerating system 19 in proper relationship to the other portions of the cabinet.

The construction of the plastic sandwich board 18 is shown most clearly in Figs. 3 and 5 and includes a heat insulating core 21 of light plastic foam that is sandwiched between inner and outer faces or skins, designated 22 and 23, respectively, preferably made of impact resistant plastic sheet material. The core is preferably made of a plastic material, such as expanded polystyrene, that has a discrete closed cell structure; i.e. the cells therein are not interconnected and hence resist the passage therethrough of water and water vapor. The inner skin 22 is made from a smooth-surfaced, easily cleaned plastic material, such as polystyrene or cellulose acetate butyrate. The inner skin 22 forms, at least in part, the wall surface of the storage areas of the refrigerator cabinet and is, therefore, constructed of materials, such as the aforementioned plastics or non-corrosive protected metals, that are resistant to moisture and food spillage, are easily cleaned, and are of pleasing appearance. The outer skin 23 of the sandwich 18 is preferably constructed of a material that is not easily damaged by impact to prevent damage to the sandwich during shipment and handling of the refrigerator, and is also preferably moisture resistant. The appearance requirements, in the case of a built-in refrigerator as is here illustrated, are not so great for the outer skin 23 as they are for the inner skin 22 and, consequently, the outer skin can be constructed of such strong, lightweight sheet material as glass fiber reinforced polyester resin, which has a fabric-like surface. Other sheet materials, including metal, may, if desired, be employed as the outer skin 23 of the plastic sandwich panel 18. The sandwich panel 18 also preferably includes interlayers and discretely placed fillets or battens of a tough strengthening material such as plywood. The preferred construction of the sandwich panel 18 is illustrated in Fig. 5, wherein a sheet of plywood 24 is disposed between the core 21 and each of the skins 22 and 23. The core 21, the inner and outer skins 22 and 23 and the plywood interlayers 24 are all preferably bonded together by a suitable cement or glue.

The plastic sandwich panel 18, as constructed of the materials mentioned above, is readily machinable by ordinary woodworking tools, and sawing, routing, drilling and punching operations can be performed thereon. Utilizing known woodworking procedures, the sandwich 18 is machine to receive the refrigerating system 19, and to mate with those portions of the cabinet shell 16 to which it is adapted to join.

The refrigerating system 19 for the two-compartment cabinet chosen for purposes of illustration includes refrigerant circulating means in the form of a motor compressor unit 28, and a condenser 29 adapted to receive hot vaporous refrigerant from the motor compressor 28 and to deliver liquid refrigerant to a freezing compartment cooling unit, or evaporator, 30 and a food storage compartment cooling unit, or evaporator, 31. These components of the refrigerating system 19 are connected by suitable refrigerant tubing, including a conduit for returning evaporated refrigerant from the evaporators 30 and 31 to the motor compressor unit 28. This is a conventional mechanical compression system of the type that is well known and well understood in the domestic refrigerator art. Such systems generally include a control, as indicated at 32, for energizing and deenergizing the motor compressor unit 28 to maintain predetermined temperatures within the refrigerated compartments 11 and 12. Mounted on the food storage compartment evaporator 31 is a motor driven fan or blower 33 that is adapted to circulate air over the evaporator 31 to facilitate the exchange of heat between the contents of the food compartment and the evaporator.

In accordance with this invention, the plastic sandwich panel 18 is specially shaped to receive and support the several components of the refrigerating system 19. For example, routed-out depressions, or recesses, in the inner face of the sandwich panel 18 are provided at 36 and 37 for receiving, respectively, a portion of the freezing compartment evaporator 30 and the food compartment evaporator 31. A recess is provided for the control 32 at 38, and the refrigerant tubing connecting the components of the refrigerating system 19 is received in trough-like recess areas 39 and 40. The motor compressor unit 28 and condenser 29 are held in place on the sandwich panel 18 by suitable bolts, screws, or other fasteners, passing through holes drilled in the panel as indicated at 41.

The area of the sandwich panel 18 that forms the back wall of the food storage compartment 11, and which houses the food compartment evaporator 31 and the control 32, is covered by the decorative plastic panel 20 to substantially obscure the evaporator 31 and control 32 from the view of the user of the refrigerator for appearance purposes and to present a smooth, easily-cleaned surface to the interior of the refrigerator cabinet. This panel 20 is constructed to provide an air inlet opening 42 and an air outlet opening 43 through which air being circulated over the food compartment evaporator 31 can pass.

It will be noted that the reception recesses 36 and 37 for the evaporators 30 and 31 of the refrigerating system are provided in the plastic sandwich panel 18 simply by routing out, or otherwise cutting away, portions of the panel, and that no additional fabrication techniques need be employed. The evaporator and control recesses 37 and 38 are decoratively covered by the panel 20, but no special sealing is required between the cover panel 20 and the sandwich panel 18, and ordinary wood screws can be employed to fasten the cover panel to the sandwich panel. The simplicity of this arrangement is due to the construction of the sandwich panel 18 which, having a discrete closed cell core 21, is capable of preventing the transmission of water and water vapor therethrough, even though one of its skins or faces, in this case the inner skin 22, is perforated. This means that the evaporators 30 and 31 may be placed in the recesses 36 and 37 of the panel 18 and held in place by wood screws, or the like, with no additional caulking, sealing or other water barrier provisions being made.

In some instances, it is desirable that certain components or elements pass entirely through the sandwich panel 18. In the refrigerator illustrated, this requirement is true of an electric motor 46 employed to drive the blower 33. The panel 18, consequently, has an opening 47 therein that extends through the outer skin 23 of the sandwich panel. This opening 47 receives the motor 46 and is preferably covered by an insulated plate 48 that is sealed to the sandwich panel outer skin 28 (see Fig. 4).

The sandwich panel 18 has a beveled peripheral edge 51 that is adapted to mate with a complementary edge portion of the cabinet shell 16 (see Fig. 5) to assure a moisture-proof joint between the back wall assembly 17 and the shell 16 when these two subassemblies of the cabinet are joined. It will be noted that the edge bevel 51 of the sandwich panel 18 is of stepped configuration to promote a better seal with the shell 16. Such shapes are easily provided in the material employed in the construction of the panel by using ordinary wood saws or routing machines. The back wall assembly 17 is adapted to be secured to the shell 16 by means of ordinary wood screws 52 that pass through the outer skin 23 and plywood inner layer 24 of the sandwich panel and extend into plywood batten strips 53 glued or cemented in routed out areas of the cabinet shell 16. If desired, a gasket may be disposed between the sandwich panel 18 and the shell 16, as indicated at 54, and the edge bevel 51 of the panel 18 may be coated with waterproof mastic (not shown) for further improving the seal between these two components. To insure a rigid cabinet structure in which the wall assembly 17 carries it share of loads imposed upon the cabinet, the entire periphery of the sandwich panel 18 is preferably uniformly attached to the cabinet shell, i.e., the screws 52 are uniformly spaced about the entire periphery of the panel 18.

In addition to the cost advantages offered by the simplified construction of the back wall assembly 17, certain other advantages are offered by this invention. It will be noted, for example, that the components of the refrigerating system 19 are supported in a rigid, easily-transportable relationship when assembled to the sandwich panel. Since the components of the refrigerating system 19 are carrried on the plastic sandwich panel 18 in the relative positions that they occupy in the finished cabinet, it is possible to test these components for proper operation in such position, but while still outside the cabinet shell 16, and hence in a readily accessible position. Repair and replacement of components of the refrigerating system are also facilitated, since these components can be readily removed from the shell 16, as a unit, simply by removing the screws 52 and separating the wall assembly 17 from the cabinet shell 16.

Modification

Figure 7:
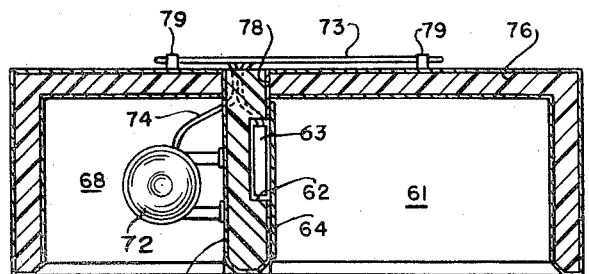
Fig. 7 is a horizontal sectional view, from above, through an assembled refrigerator cabinet of the type shown in Fig. 6.

Figs. 6 and 7 illustrate another manner of fabricating a refrigerator cabinet generally of the type shown in Fig. 1. In this embodiment of the invention, a plastic sandwich panel is employed in a somewhat different manner than in the previously described embodiment. In this embodiment, the sandwich panel, designated by the numeral 59, forms a part of a wall assembly that takes the form of a partition structure 60 that divides the cabinet into a plurality of storage compartments. The plastic sandwich panel 59 is of the type previously described, in which a lightweight plastic core of discrete closed cell structure separates skin members of dense sheet material. In this application, since both faces of the sandwich panel form interior walls of the refrigerator cabinet, it is desirable that both skin members be of the same smooth-surfaced, easily-cleaned material, such as polystyrene. The face of the panel that forms one wall of a food storage compartment 61 has a recess 62 therein for receiving an evaporator or cooling unit 63 of the cabinet refrigerating system. This recess 62 is formed by cutting through one skin of the sandwich and routing out a portion of the sandwich core. The routed-out area of the panel is preferably covered by a decorative plate 64 having openings 65 and 66 therein, providing an inlet and an outlet for air that is circulated over the cooling unit 63. The opposite face of the sandwich panel 59 forms an inner wall for both a freezing compartment 67 and a machinery compartment 68, which compartments are separated by a horizontal insulating partition 69, carried by the sandwich panel 59 and forming a part of the partition structure 60. The partition 69 is preferably made of the same sandwich material as the panel 59. The sandwich panel 59 also carries and supports a freezing compartment evaporator 71 and a motor compressor unit 72. Unlike the previously described embodiment, the condenser for the refrigerating system, which component is identified by the numeral 73, is not rigidly supported on the partition structure 60, but is flexibly connected thereto by tubing 74 forming a portion of the refrigerating system. This arrangement permits installation of the condenser exteriorly of the cabinet and, in some instances, eliminates the necessity of forcing cooling air over the condenser.

The cabinet includes an open front, insulated box or shell 76 shaped to receive the partition structure 60 and to define therewith the several compartments of the cabinet. The cabinet doors, normally positioned at the front of the cabinet, as shown in Fig. 1, have been omitted from Figs. 6 and 7 to clarify the illustration. As shown in Fig. 6, the shell 76 has vertically aligned cut-out areas, or channels, 77 in the upper and lower walls thereof to receive the top and bottom edges of the sandwich panel 59. The back wall of the shell 76 has a vertical slot 78 therein that is aligned with the channels 77. In assembling the modified cabinet shown in Fig. 6, the condenser 73 is passed through the cabinet shell 76 and out through the slot 78 in the rear wall of the shell, and the partition structure 60 is moved through the front of the shell 76. The condenser 73 is thereafter turned and secured to the cabinet by means of brackets 79 or other suitable supporting means, as shown in Fig. 7. The partition structure 60, when fully assembled to the cabinet shell 76, occupies the position shown in Fig. 7 in which the rear edge of the panel projects into and seals the slot 78 in the rear of the shell. Suitable sealing or caulking compounds are preferably applied to the mating surfaces of the sandwich partition 60 and cabinet shell 76 to prevent the passage of heat and moisture into the refrigerated compartments.

It will be noted that in this embodiment of the inventoin, as in the previously described embodiment, the sandwich panel 59 is utilized as a structural and thermal insulating element of the refrigerator cabinet and is additionally employed as a means for supporting elements of the refrigerating system that cools the cabinet. The food storage compartment evaporator 63 is conveniently mounted within the recess 62 of the sandwich panel 59 and, because of the moisture resistant characteristics of the sandwich panel, no special provision need be made for sealing off the recess 62. The decorative cover or plate 64, which serves to obscure the evaporator 63 from the view of the user may, therefore, be secured to the sandwich panel 59 by any suitable fastening means, with no special provision being made for sealing the cover to the panel.

From the foregoing, it will be apparent that this invention effectively utilizes the unusual characteristics of a plastic sandwich panel in the construction of a domestic refrigerator. Moreover, it should be apparent that refrigerator cabinets embodying this invention can be constructed more easily and more economically than was heretofore possible with more conventional materials and fabricating techniques. While two forms of the invention are shown and described, it will be obvious to those skilled in the art that it is not so limited, but is susceptible of various other changes and modifications without departing from the spirit and scope thereof as defined by the appended claims.

What is claimed is:

1. A structural wall unit for refrigerator cabinets comprising an insulating core member of discrete closed cell structure having the ability to resist passage of water and water vapor therethrough, impact resistant skin sheets secured to opposite faces of said core member and cooperating with said core member to form a rigid panel structure, one of said sheets having an opening therein, said core having a recess therein coextensive with the opening in said one sheet, said recess extending partially through said core member, a refrigerating system including a cooling unit and a refrigerant circulating unit, said cooling unit being disposed in the said recess in said core member, and means for supporting said refrigerant circulating unit on said panel structure in spaced relation to said cooling unit, the construction and arrangement being such that said cooling unit and said refrigerant circulating unit can be transported in fixed, spaced relation by said panel structure.

2. A structural wall unit for refrigerator cabinets comprising a panel having an insulating core member of discrete closed cell structure and impact resistant sheet members on the faces of said core, said panel having a recess in one face thereof, said recess extending through one of the sheet members of said panel and into the core member of the panel, a refrigerating system having a cooling unit and a refrigerant circulating unit, said cooling unit being disposed in the recess in said panel, means for supporting said refrigerant circulating unit on said panel in spaced relation to said cooling unit, and a cover for the said recess in said panel.

3. In a refrigerator, the combination of heat insulating wall members defining a refrigerated chamber, at least one of said wall members being constructed of a laminated panel comprising an insulating core member of discrete closed cell structure and impact resistant sheet members on opposite surfaces of said core member, said one wall member having a recess in the surface thereof facing inwardly of said chamber, said recess extending through one of the sheet members of the said wall and into the core member of the wall, a refrigerating system having a cooling unit and a refrigerant circulating unit, said cooling unit being disposed in the recess in said one wall, means for supporting said refrigerant circulating unit on said one wall, and a plate-like member covering the recess in said one wall, said plate-like member having inlet and outlet openings therethrough to permit circulation of the air in said chamber over said cooling unit.

4. The method of constructing a refrigerator cabinet that comprises the steps of: providing, in a laminated panel comprising an insulating core member of discrete closed cell structure sandwiched between impact resistant sheet members, a recess in one surface of the panel, said recess extending through one of the sheet members of the panel and into the core member of the panel; attaching to said panel a refrigerating system comprising a cooling unit and a condensing unit, with the cooling unit disposed in the said recess and the condensing unit supported by another region of the panel spaced from said recess, whereby said panel and said refrigerating system are structurally interconnected to permit the panel and the system to be transported as a unit; forming insulated wall members capable of defining, together with said panel, a completely enclosed cabinet; assembling said panel to said wall members with the panel surface having the recess therein disposed inwardly with respect to a refrigerated chamber defined by said panel and said wall members; and fastening said panel to said walls to rigidly connect the panel and walls into a self-supporting cabinet.

5. The method of constructing a refrigerator cabinet that comprises the steps of: providing, in a laminated panel comprising an insulating core member of discrete closed cell structure sandwiched between impact resistant sheet members, a recess in one surface of the panel, said recess extending through one of the sheet members of the panel and into the core member of the panel; attaching to said panel a refrigerating system comprising a cooling unit and a condensing unit, with the cooling unit disposed in the said recess and the condensing unit supported by another region of the panel spaced from said recess, whereby said panel and said refrigerating system are structurally interconnected to permit the panel and the system to be transported as a unit; forming insulated wall members capable of defining, together with said panel, a completely enclosed cabinet; assembling said panel to said wall members with the panel surface having the recess therein disposed inwardly with respect to a refrigerated chamber defined by said panel and said wall members; fastening said panel to said walls to rigidly connect the panel and walls into a self-supporting cabinet; and assembling to said panel a cover member for the said recess therein.

References Cited in the file of this patent

UNITED STATES PATENTS

| | | |
|---|---|---|
| 2,392,727 | Dailey | Jan. 8, 1946 |
| 2,502,581 | Morrison | Apr. 4, 1950 |
| 2,507,379 | Morrison | May 9, 1950 |
| 2,644,316 | Wyman | July 7, 1953 |
| 2,666,979 | Van Dusen | Jan. 26, 1954 |
| 2,735,277 | Clark | Feb. 21, 1956 |
| 2,765,525 | O'Neill | Oct. 9, 1956 |